US011655772B2

(12) United States Patent
Gons et al.

(10) Patent No.: US 11,655,772 B2
(45) Date of Patent: May 23, 2023

(54) TAKEOFF POWER BOOST

(71) Applicant: TEXTRON INNOVATIONS INC., Providence, RI (US)

(72) Inventors: William Gons, Dallas, TX (US); Brett Partington, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/647,301

(22) Filed: Jan. 6, 2022

(65) Prior Publication Data
US 2022/0128013 A1   Apr. 28, 2022

Related U.S. Application Data

(62) Division of application No. 16/508,673, filed on Jul. 11, 2019, now Pat. No. 11,248,552.

(51) Int. Cl.
| F02D 41/14 | (2006.01) |
| F02D 35/00 | (2006.01) |
| B64C 27/22 | (2006.01) |
| F01N 3/05 | (2006.01) |

(52) U.S. Cl.
CPC ..... *F02D 41/1448* (2013.01); *F02D 35/0038* (2013.01); *B64C 27/22* (2013.01); *F01N 3/05* (2013.01); *F02D 2250/34* (2013.01); *F05D 2260/80* (2013.01)

(58) Field of Classification Search
CPC ..... F02C 7/32; F02K 1/36; F02K 1/38; F02K 1/386; F02K 1/46; F02K 1/825; B64C 27/12; B64C 27/22; B64C 29/0033; B64D 27/52; B64D 33/06; B64D 33/08; B64D 2033/045; F01N 3/05; F02D 35/0038; F02D 41/1448; F05D 2250/34
See application file for complete search history.

(56) References Cited

U.S. PATENT DOCUMENTS

| 3,921,906 | A | 11/1975 | Nye et al. | |
| 2014/0084080 | A1* | 3/2014 | Robertson | F02K 1/825 239/127.3 |
| 2016/0333797 | A1* | 11/2016 | Laramee | B64D 33/04 |
| 2018/0080410 | A1* | 3/2018 | Pesyna | F02K 1/12 |
| 2018/0149092 | A1* | 5/2018 | Zeller | F02C 7/055 |
| 2018/0149114 | A1* | 5/2018 | Pantalone, III | F02K 1/825 |

* cited by examiner

*Primary Examiner* — Jason H Duger
(74) *Attorney, Agent, or Firm* — Fogarty LLP

(57) ABSTRACT

Embodiments are directed to boosting aircraft engine performance for takeoff and critical mission segments by reducing airflow used for cooling exhaust gases. The airflow is reduced by stopping an accessory blower or by closing an external air vent Eliminating the cooling airflow to the exhaust has the effect of lowering the backpressure on the engine, which thereby increases maximum engine power.

9 Claims, 8 Drawing Sheets

TAKEOFF POWER BOOST

CROSS-REFERENCE TO RELATED APPLICATION

This application is a divisional of, and claims benefit of, U.S. patent application Ser. No. 16/508,673, filed Jul. 11, 2019, which is hereby incorporated herein by reference in its entirety.

BACKGROUND

Vehicles that are involved in military operations need to reduce their exposure to opposing forces, including, for example, minimizing detection by visual, active and passive radar, and/or infrared means. Avoiding detection is especially critical for aircraft, including fixed-wing, rotorcraft, and tiltrotor aircraft, that may be targeted by enemy air and ground forces using any of the above detection means. In addition, lowering the exhaust gas temperature can extend the life of components in the immediate path of such gasses. Many methods have been developed to reduce the infrared signature of aircraft, such as using special exhaust ducting and shrouding to reduce the heat signature in engine exhaust and adding infrared-insulative and infrared-absorptive materials on the outer surface of the aircraft. Although these methods can be effective when properly employed, each of these methods has drawbacks, such as added weight, heating of the ducting or shrouding, and/or adverse aerodynamic characteristics.

SUMMARY

Embodiments are directed to systems and methods for managing airflow to an engine. A flight control computer may identify current aircraft flight conditions based upon aircraft operating parameters. The aircraft operating parameters may include, for example, a landing gear position, a weight on wheel sensor output, a throttle position, an airspeed, an altitude, an acceleration force, or the like. Additionally, the aircraft operating parameters may comprise engine and accessory gearbox operating conditions, temperatures, pressures, and the like. The aircraft operating parameters may further include environmental conditions, such as air temperature, air pressure, and the like. The current aircraft flight condition may include, for example, a takeoff configuration, a landing configuration, or a mission-specific configuration.

If the current aircraft flight condition requires maximum engine power, then the flight control computer stops a flow of cooling air from mixing with primary exhaust airflow of an engine. For example, the aircraft flight condition may indicate a takeoff configuration that requires maximum engine power for safety. The flight control computer may close an access vent that is configured to provide external airflow to a mixing section of the engine. Alternatively, in another embodiment, the flight control computer may stop a blower that is configured to provide accessory airflow to the mixing section of the engine.

The flight control computer may monitor a temperature of one or more engine accessory components. The flight control computer may then restart a blower when the accessory component temperature rises above a threshold level. In other embodiments, the flight control computer may restart the flow of cooling air after a preset duration or when the current flight condition of the aircraft has changed.

BRIEF DESCRIPTION OF THE DRAWINGS

Figure 1:
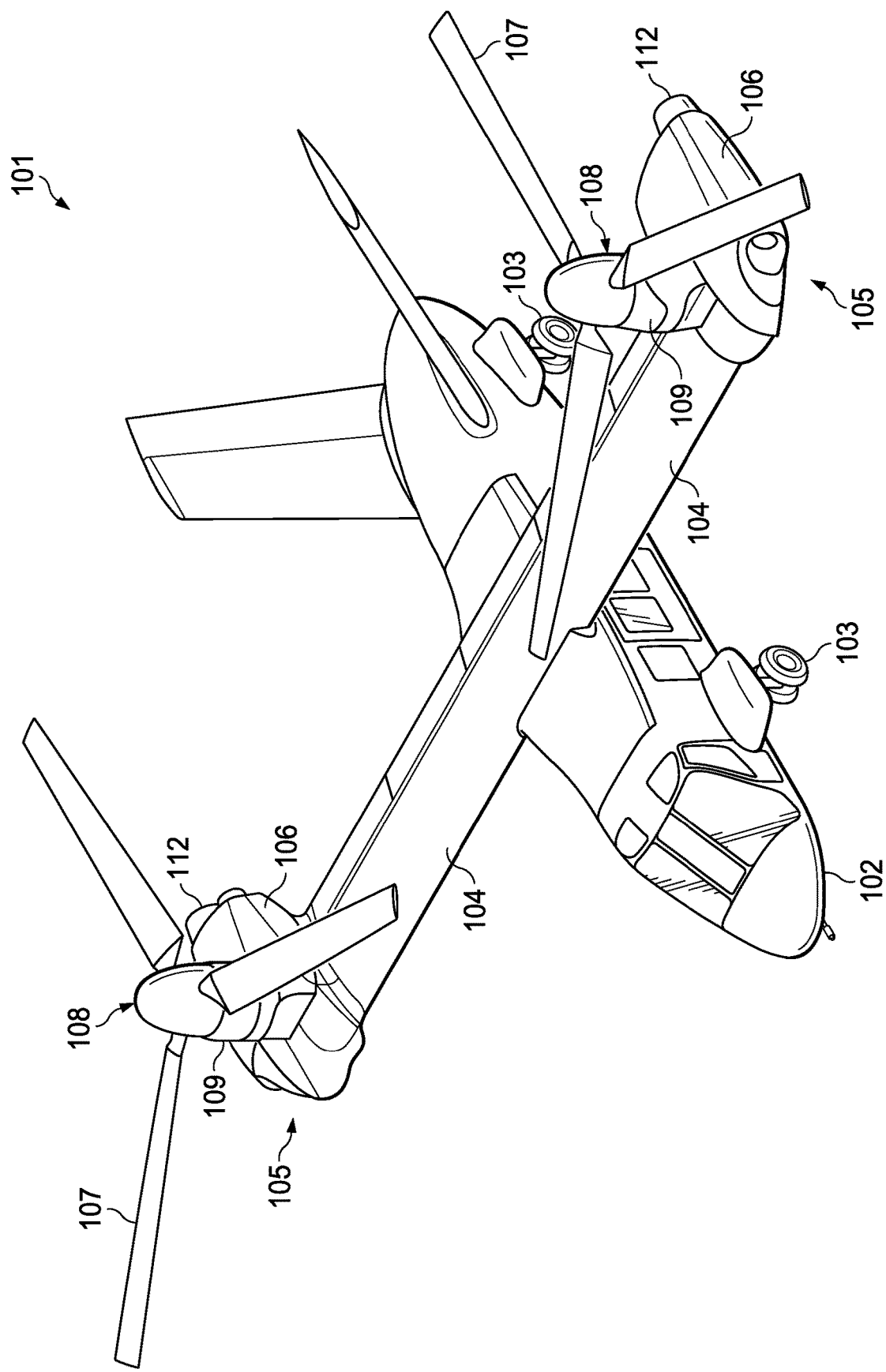

Having thus described the invention in general terms, reference will now be made to the accompanying drawings, which are not necessarily drawn to scale, and wherein:

FIG. 1 illustrates a tiltrotor aircraft in a helicopter mode wherein the proprotors are positioned substantially vertical for use with certain embodiments.

Figure 2:
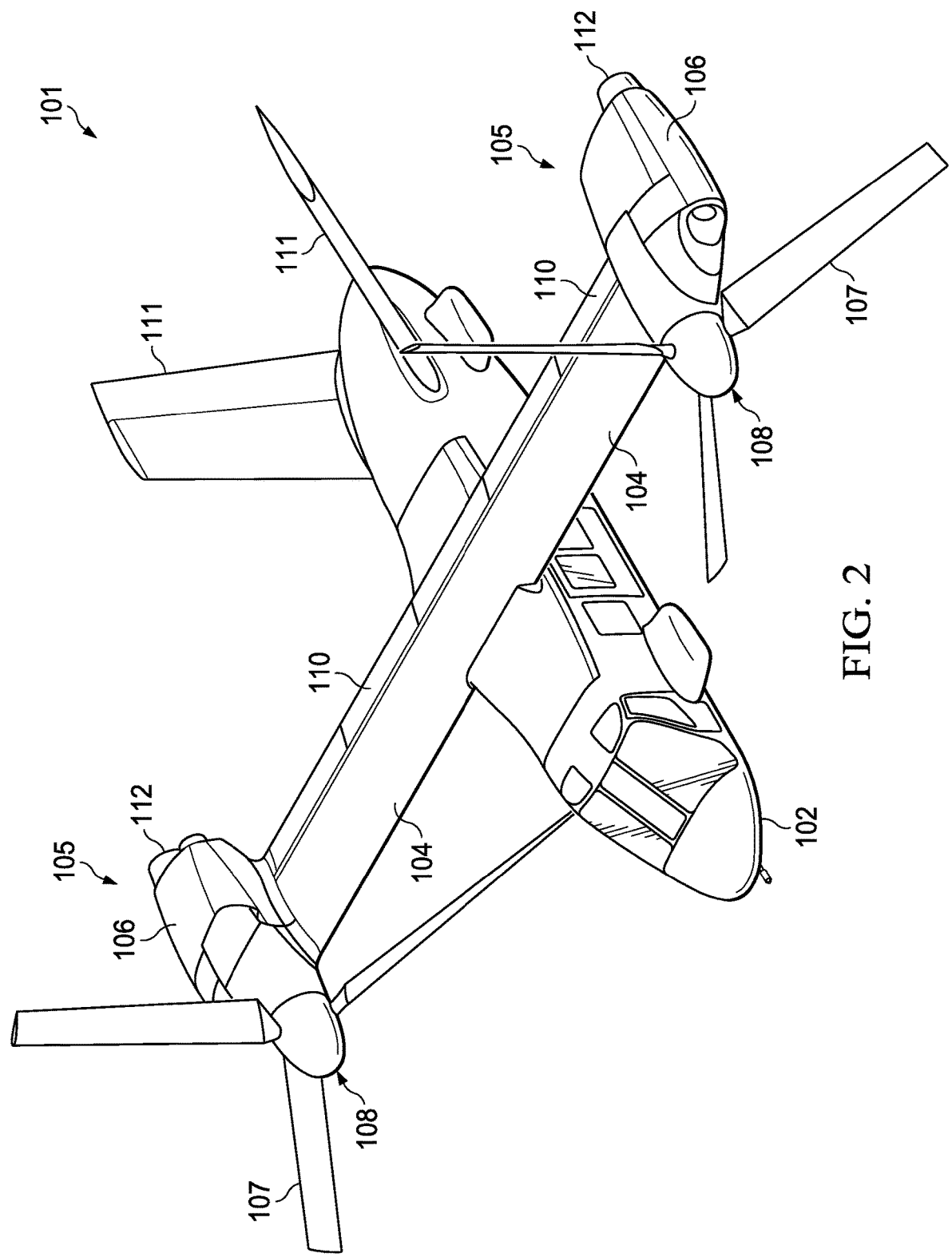

FIG. 2 illustrates the tiltrotor aircraft of FIG. 1 in an airplane mode wherein the proprotors are positioned substantially horizontal.

Figure 3A:
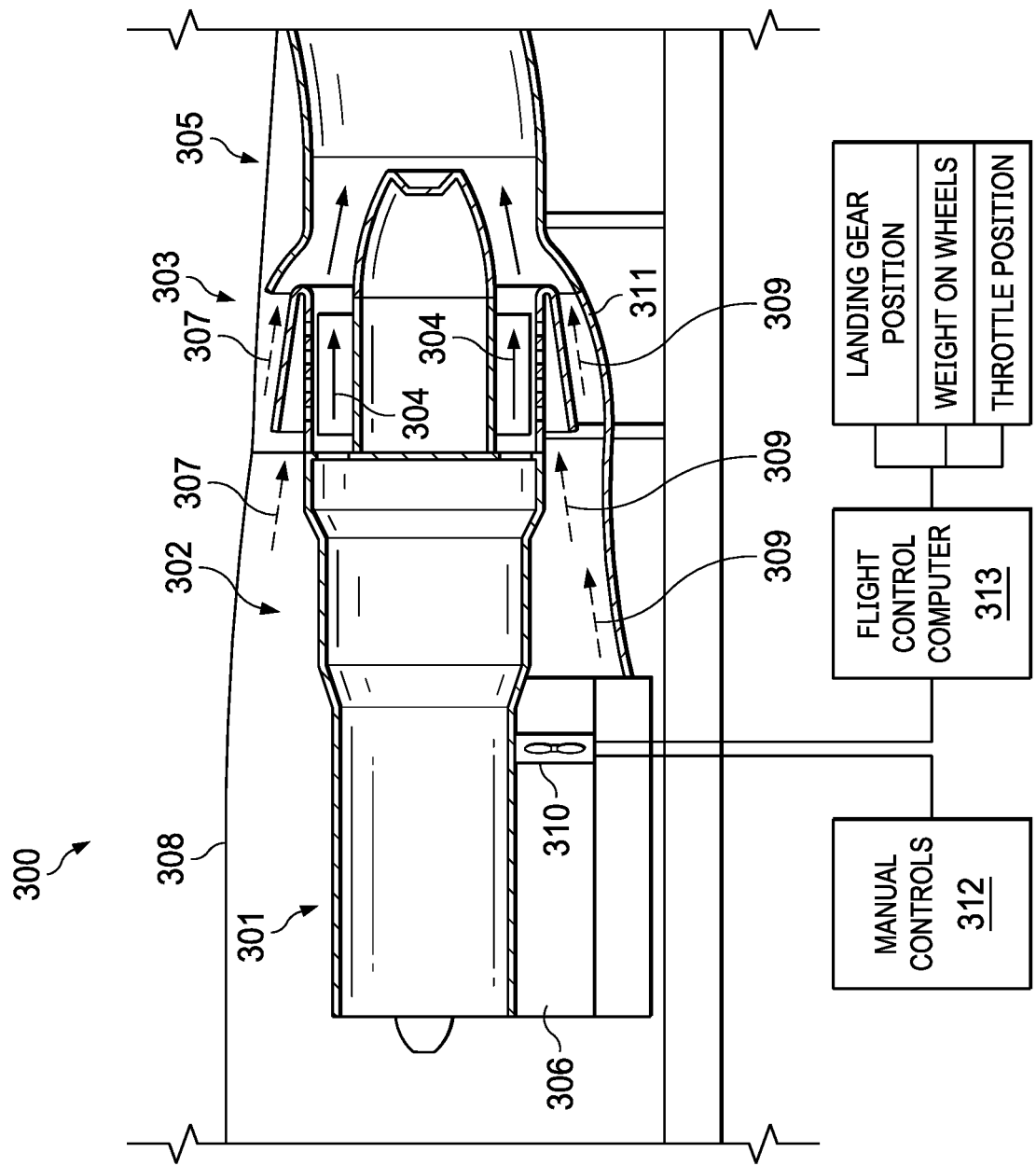
Figure 3B:
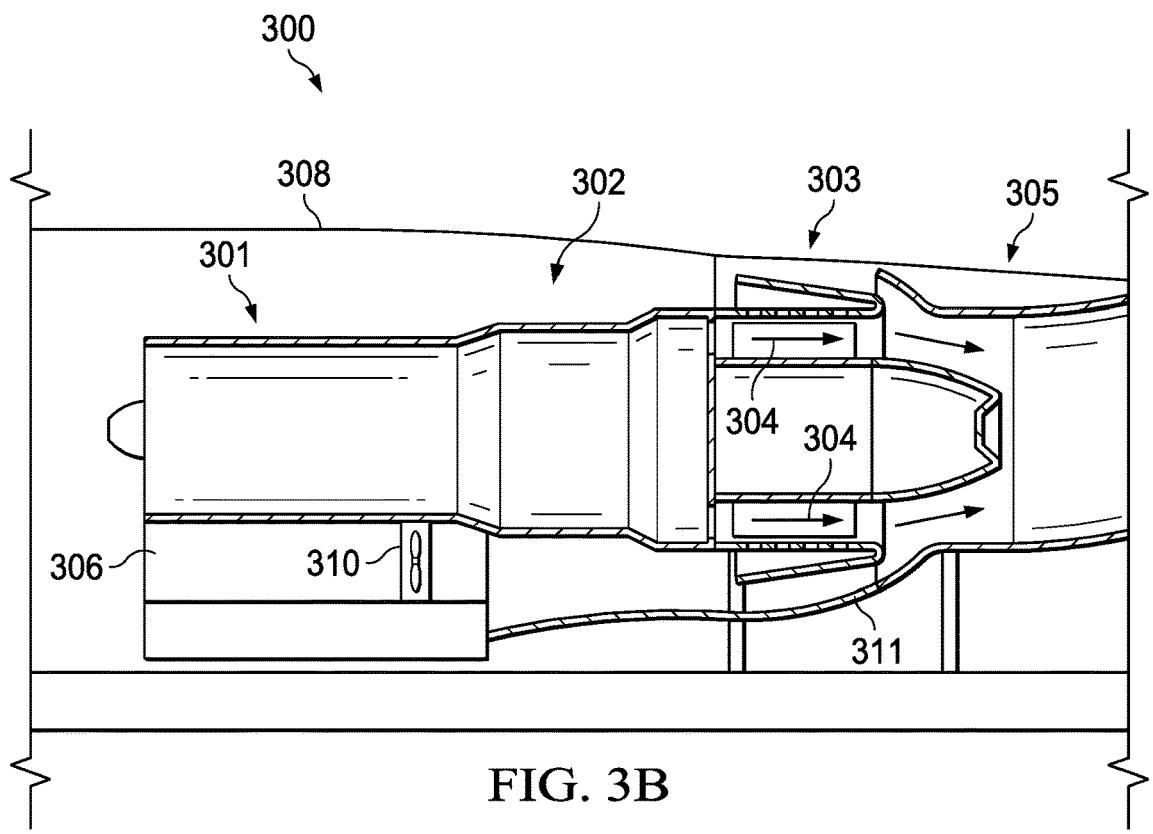

FIGS. 3A and 3B illustrate an aircraft engine that employs blower-driven cooling according to an example embodiment.

Figure 4B:
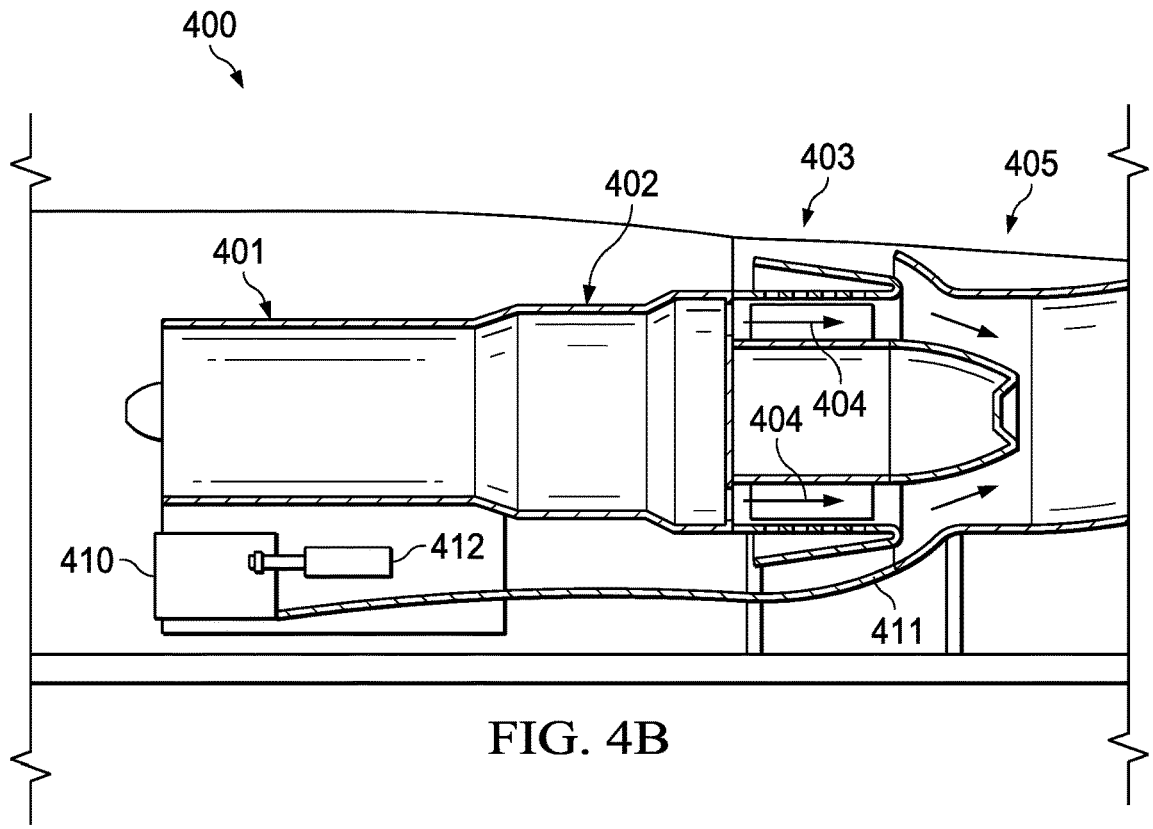
Figure 4A:
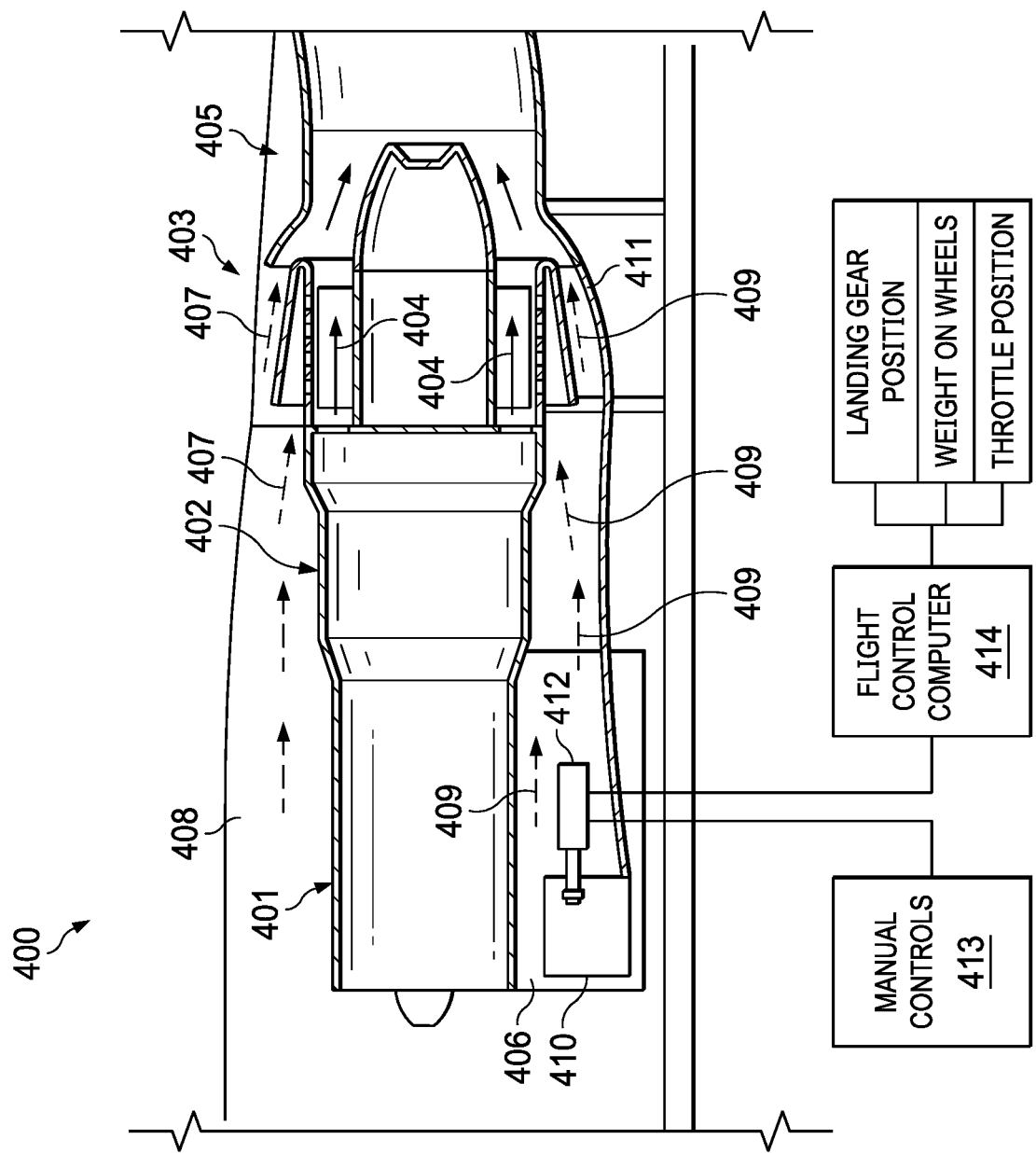

FIGS. 4A and 4B illustrate an aircraft engine that employs a passive cooling system according to an example embodiment.

Figure 5:
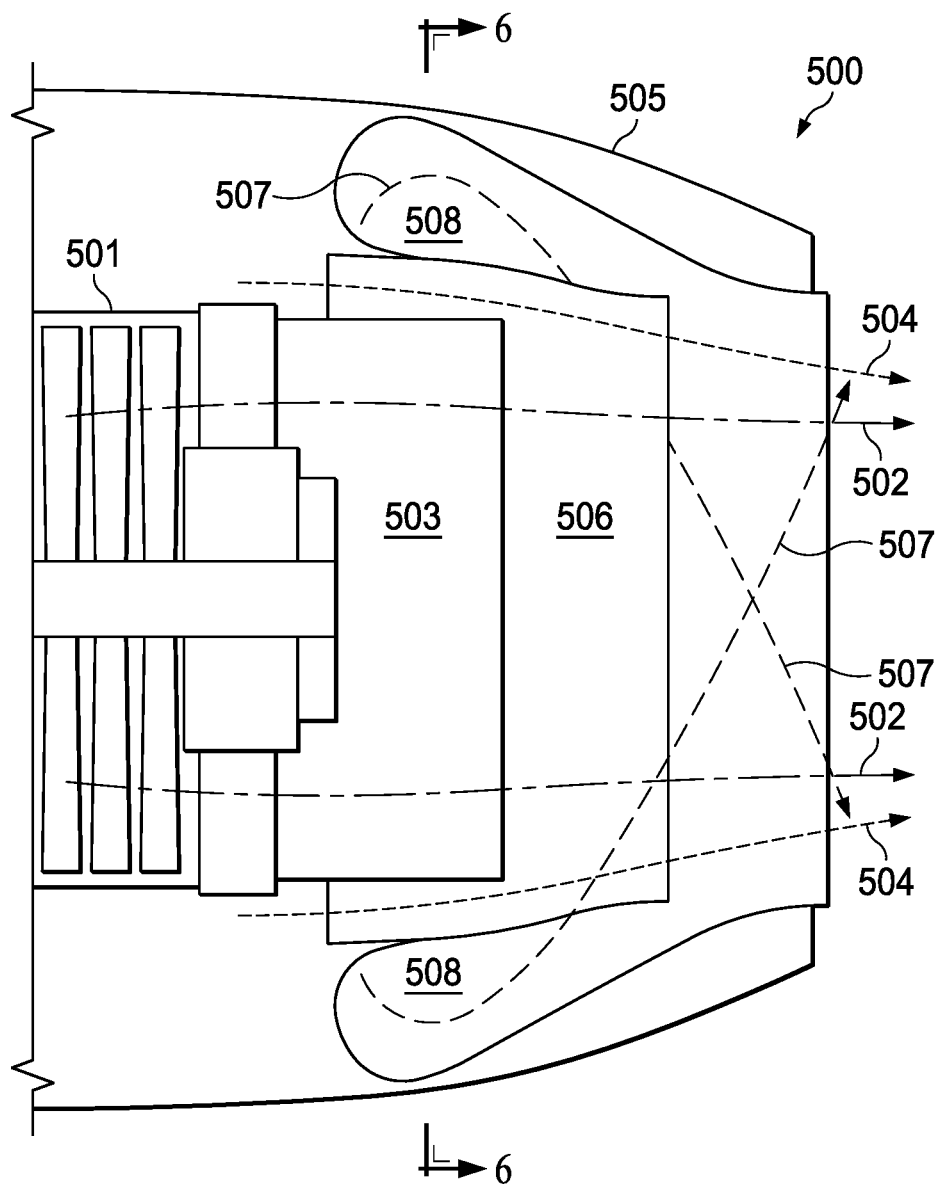

FIG. 5 is a cross-section view of an exhaust area of an engine showing the mixing of three different airflow streams according to an example embodiment.

Figure 6:
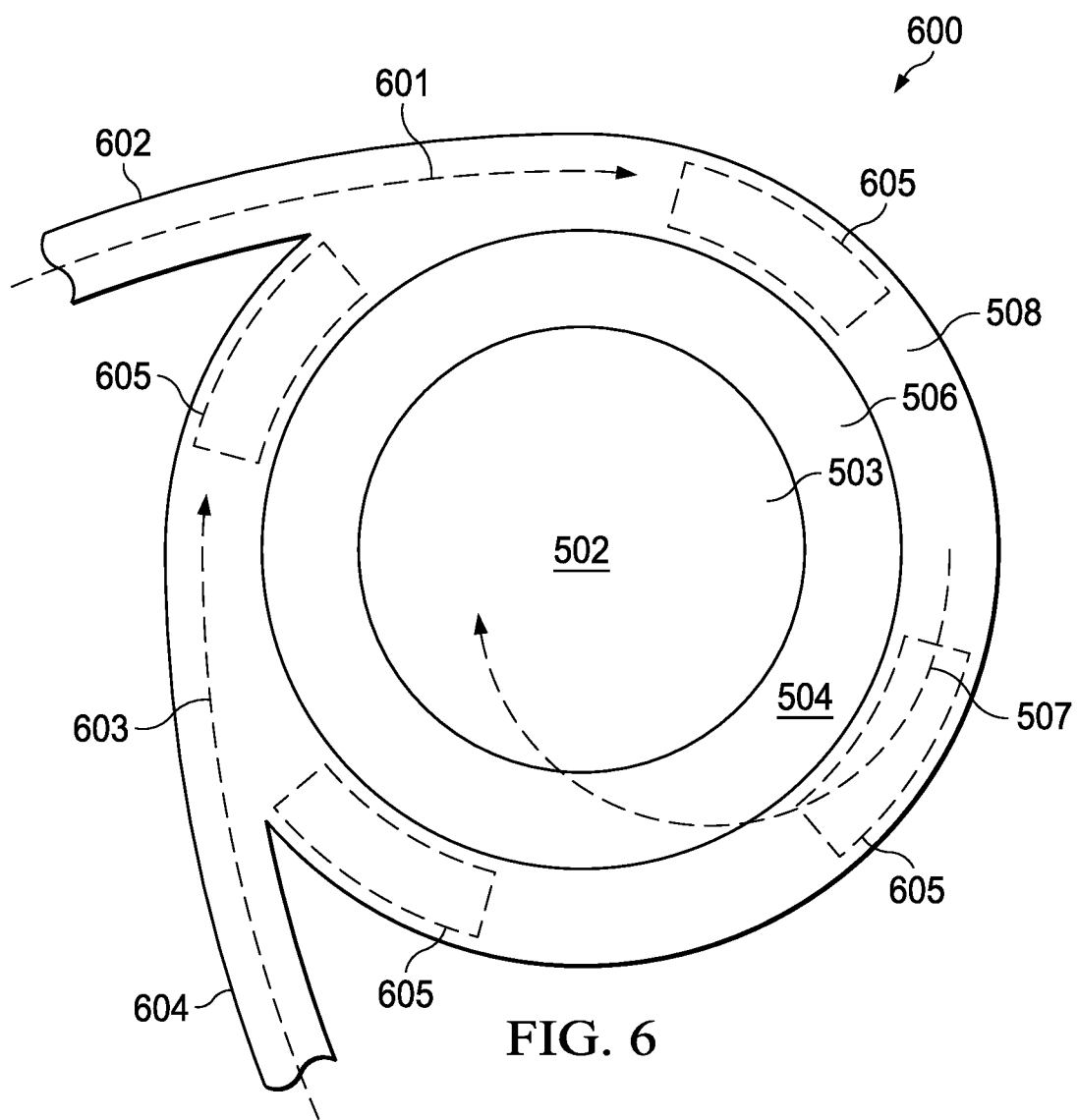

FIG. 6 is a cross-section view of the exhaust area shown in FIG. 5.

Figure 7:
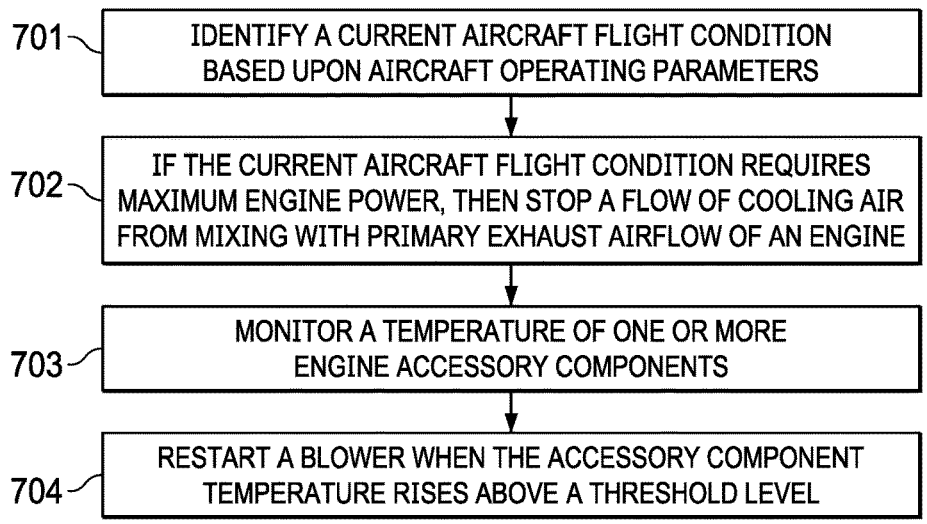

FIG. 7 depicts a flowchart of a process for managing airflow to an engine according to one embodiment.

Figure 8:
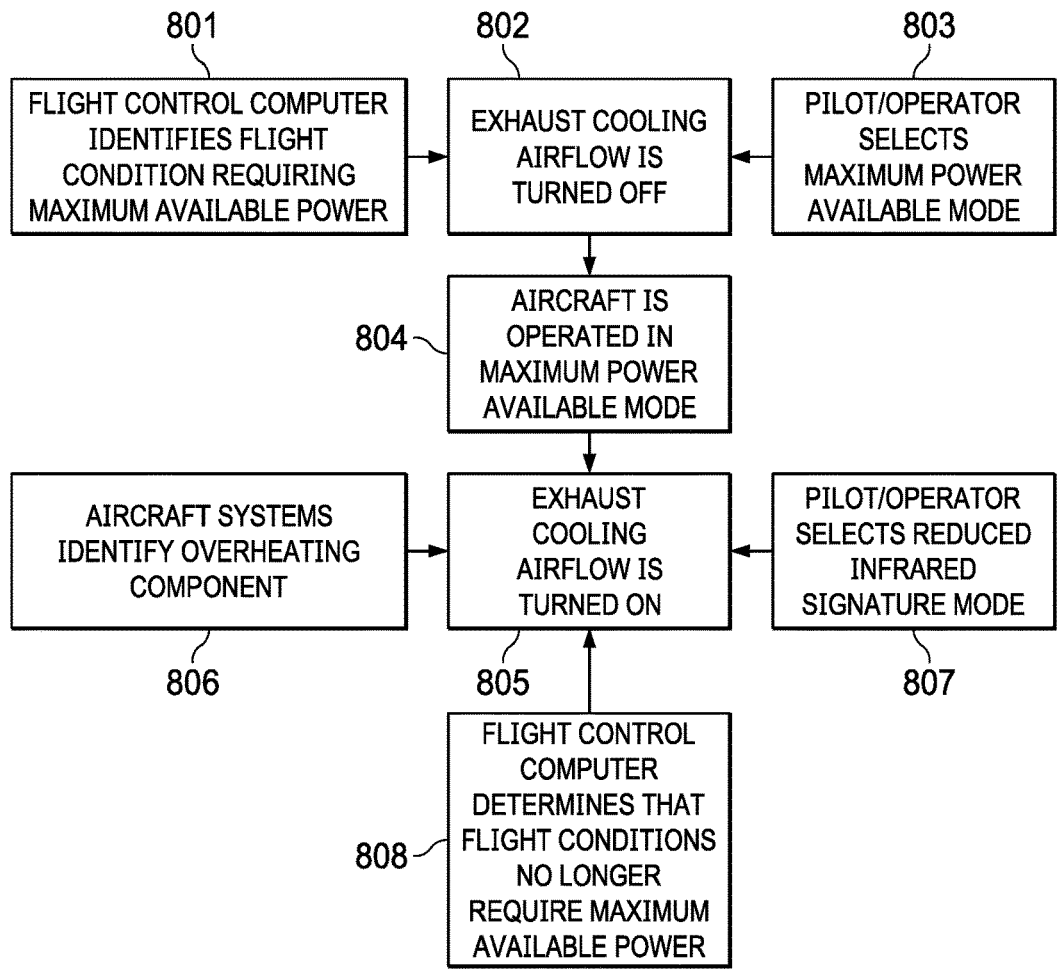

FIG. 8 depicts a flowchart of a process for managing engine airflow for an aircraft requiring maximum available power according to an example embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates a tiltrotor aircraft 101 in a helicopter mode wherein proprotors 107 are positioned substantially vertical to provide a lifting thrust. FIG. 2 illustrates tiltrotor aircraft 101 in an airplane mode wherein proprotors 107 are positioned substantially horizontal to provide a thrust for forward movement. The following discussion refers to the example embodiments shown in FIGS. 1 and 2. Tiltrotor aircraft 101 may include fuselage 102, landing gear 103, and wings 104. A propulsion system 105 is positioned on the ends of wings 104. Each propulsion system 105 includes an engine 106 and a proprotor 108 with a plurality of rotor blades 107. During operation, engines 106 typically maintain a constant rotational speed for their respective proprotors 107. The pitch of rotor blades 107 can be adjusted to selectively control thrust and lift of each propulsion system 105 on tiltrotor aircraft 101. The tiltrotor aircraft 101 includes controls, e.g., cyclic controllers and pedals, carried within a cockpit of fuselage 102, for causing movement of the aircraft 101 and for selectively controlling the pitch of each blade 107 to control the direction, thrust, and lift of tiltrotor aircraft 101. For example, during flight a pilot can manipulate a cyclic controller to change the pitch angle of rotor blades 107 and/or manipulate pedals to provide vertical, horizontal, and yaw flight movement.

Propulsion system 105 includes a pylon 109 that is configured to rotate along with other rotatable pylon structure to improve aerodynamic airflow. Moveable pylon 109 can be mechanically coupled to an actuator system used for moving the proprotors 107 between airplane mode and helicopter mode. During the airplane mode, vertical lift is primarily supplied by the airfoil profile of wings 104, while rotor blades 107 provide forward thrust. During the helicopter mode, vertical lift is primarily supplied by the thrust of rotor blades 107. It should be appreciated that tilt rotor aircraft 101 may be operated such that propulsion systems 105 are selectively positioned between airplane mode and helicopter mode, which can be referred to as a conversion mode. Control surfaces 110 on wing 104 are used to adjust the attitude of tiltrotor aircraft 101 around the pitch, roll, and yaw axes while in airplane or conversion mode. Additional stabilizers or control surfaces 111 may be required when tiltrotor aircraft 101 is in airplane mode. Control surfaces 110 and 111 may be, for example, ailerons, flaps, slats, spoilers, elevators, rudders, or ruddervators.

Propulsion system 105 for a tiltrotor aircraft 101 typically features a power train, drive shaft, hub, swashplate, and pitch links within pylon 109. The drive shaft and hub are mechanical components for transmitting torque and/or rotation from the engine 106 to the rotor blades 107. The power train may include a variety of components, including a transmission and differentials. In operation, the drive shaft receives torque or rotational energy from engine 106 and rotates the hub, which causes blades 107 to rotate about the drive shaft. A swashplate translates flight control input into motion of blades 107. Rotor blades 107 are usually spinning when tiltrotor aircraft 101 is in flight, and the swashplate transmits flight control input from the non-rotating fuselage 102 to the hub, blades 107, and/or components coupling the hub to blades 107 (e.g., grips and pitch horns).

FIGS. 1 and 2 show a propulsion system 105 in which engine 106 remains in a fixed position while proprotor 108, rotor blades 107, and pylon 109 rotate between the helicopter, conversion, and airplane modes. The exhaust gases from engine 106 are expelled through exhaust nozzle or tailpipe 112 in a rearward direction in all aircraft configurations. In other embodiments, the entire propulsion system 105, including engine 106, may rotate relative to wing 104. In such an embodiment, the exhaust nozzle 112 would also rotate with engine 106 so that exhaust gases are expelled in a rearward direction during aircraft mode, downward in helicopter mode, and in both directions during conversion mode.

The infrared radiation generated by engine exhaust is widely used by military forces to detect and track aircraft. Infrared homing (e.g., "heat seeking") can be used in passive weapon guidance systems, such as passive missile systems that use infrared emissions from a target aircraft to track and intercept it. Accordingly, it is important for military aircraft or aircraft exposed to hostile forces to minimize the infrared radiation generated by engine exhaust. Since the engine exhaust heat is the primary source of an aircraft's infrared radiation, it is necessary to lower the exhaust gas temperature to reduce the infrared radiation. In one embodiment, a blower and simple mixer may be used to greatly cool the engine exhaust gas from an aircraft engine for infrared suppression. However, the introduction of extra cooling airflow in the engine exhaust increases engine backpressure and can impact engine performance. Increasing the engine backpressure decreases the engine power available. Accordingly, it may be desirable to turn off or redirect infrared suppression airflow during certain flight conditions or missions.

FIGS. 3A and 3B illustrate an aircraft engine 300 that employs blower-driven cooling according to an example embodiment. Engine 300 is a gas turbine engine comprising compressor 301, combustion 302, and turbine 303 sections. Inlet air is taken into the compressor 301 and compressed to a high pressure. The compressed air is mixed with fuel and ignited, which produces high-pressure, high-velocity gas 304. This gas 304 is used to turn the turbine section 303, which then powers the compressor 301 section via a coupling shaft. After passing through the turbine 303 section, the gas is expelled through an exhaust nozzle or tailpipe section 305. The coupling shaft also drives an accessory gearbox 306, which in turn drives accessories such as generators, hydraulic pumps, oil pumps, and the like. In a tiltrotor aircraft, the accessory gearbox 306 also has a driveshaft that powers a main rotor gearbox (not shown). The main rotor gearbox drives the rotor system and turns the rotor blades to provide lift.

Three different airflow streams are shown exiting engine 300 according to an example embodiment. The primary exhaust airflow 304 comprises hot gas from the engine and exits turbine section 303 through exhaust nozzle 305. A secondary exhaust airflow 307 comprises engine bay ejected flow that passes along the outside of the engine 300 and within an engine shroud 308. The secondary exhaust airflow 307 may originate, for example, from vents in an engine bay, from a low-pressure compressor section, from a bypass duct, or the like. The secondary exhaust airflow 307 joins with the primary exhaust airflow 304 in turbine section 303 or exhaust nozzle area 305.

The exhaust airflow illustrated in FIG. 3A also uses a tertiary airflow 309 to provide additional cooling air into the exhaust airflow. The tertiary airflow 309 originates from one or more sources external to engine 300 itself, such as a blower 310 for an oil cooler blower and/or engine particle separator (EPS) in accessory gearbox 306. Ducting 311 guides the blower exhaust airflow 309 to turbine section 303 or exhaust nozzle 305 where it is mixed with primary exhaust airflow 304 and secondary exhaust airflow 307.

Certain military aircraft may use the tertiary airflow 309 as part of an infrared (IR) suppression system that cools the exhaust airflow exiting nozzle section 305 in order to reduce exposure to weapons guided by infrared radiation. Because the blower airflow in duct 311 does not pass through the compression and combustion sections of engine 300, it has a much lower temperature than the engine exhaust airflow 304. The blower bypass air 309 can be mixed with the engine exhaust 304 to reduce the overall temperature of the air leaving exhaust nozzle 305. Mixing these airflows will bring down the temperature of the exhaust that is exposed outside exhaust nozzle 305. However, this type of IR suppression may have performance impact on the efficiency of engine 303 due to the extra cooling airflow being introduced into the exhaust airflow 304. The added tertiary airflow 309 creates a backpressure in nozzle section 305, which reduces the primary airflow 304 and thereby reduces the power available from engine 300.

FIG. 3B depicts aircraft engine 300 without the blower-driven cooling, which may be achieved, for example, by turning off blower 310, closing ducting 311, or venting the blower exhaust 309 overboard before turbine section 303 or exhaust nozzle 305. By pausing the tertiary airflow 309, which is normally used for cooling and IR suppression, the backpressure on engine 300 is reduced in turbine section 303 and exhaust nozzle 305. Lowering the backpressure increases the maximum available engine power.

The increased power available may be useful in certain phases of flight, such as during takeoff/landing or critical mission segments when flight safety has a higher priority than IR suppression. Stopping the tertiary airflow into the exhaust airflow may occur manually and/or automatically. For example, a pilot may be able to manually turn off or redirect the cooling airflow using a flight control input 312 or switch on an instrument panel. When selected off manually, the cooling airflow may be blocked until manually selected on again by the pilot or may remain in an off condition for a predetermined interval, such as for one minute. Alternatively, in another embodiment, a flight control computer 313 may turn off or redirect the cooling airflow under certain aircraft conditions. For example, when the flight control computer 313 recognizes a takeoff configuration (e.g., gear down, weight on wheels, throttles at maximum), it may turn off the cooling airflow to maximize engine power. The flight control computer 313 may then return cooling airflow to the exhaust airflow after a specified period of time or after flight conditions change, such as, for example, when the landing gear is retracted, when the aircraft is more than a specified height above ground, or when the rotor system and/or engines move between a vertical and horizontal position in a tiltrotor aircraft. In some embodiments, the air from blower 310 is required to cool accessories, such as an oil cooler, and turning off the blower 310 may have a negative impact on the function and operation of those accessories. Accordingly, the period of time that blower 310 is allowed to remain off may be determined by the requirements of the accessory components in view of operating and environmental conditions. Alternatively, flight control computer 313 may also receive information related to the temperature of those accessories (e.g., oil cooler temperature) and may turn on blower 310 in order to maintain an acceptable temperature range for the accessories even if the IR suppression airflow was requested to be turned off. For example, the flight control computer 313 may observe the current temperature and/or rate of temperature change of an accessory component or the gearbox itself and determine whether or not to turn blower 310 back on.

FIGS. 4A and 4B illustrate an aircraft engine 400 that employs a passive cooling system according to an example embodiment. Engine 400 is a gas turbine engine comprising compressor 401, combustion 402, and turbine 403 sections. High-pressure, high-velocity exhaust gas 404 is expelled through an exhaust nozzle or tailpipe section 405.

Similar to FIGS. 3A and 3B, three different airflow streams are shown exiting engine 400 according to an example embodiment. The primary exhaust airflow 404 comprises hot gas from the engine and exits turbine section 403 through exhaust nozzle 405. A secondary exhaust airflow 407 comprises engine bay ejected flow that passes along the outside of the engine 400 and within an engine shroud 408. The secondary exhaust airflow 407 may originate, for example, from vents in an engine bay, from a low-pressure compressor section, from a bypass duct, or the like. The secondary exhaust airflow 407 joins with the primary exhaust airflow 404 in turbine section 403 or exhaust nozzle area 405.

The exhaust airflow illustrated in FIG. 4A also uses a tertiary airflow 409 to provide additional cooling air into the exhaust airflow. The tertiary airflow 409 originates from one or more sources external to engine 400 and accessory gearbox 406, such as an external vent, duct, or door 410. Ducting 411 guides the blower exhaust airflow 409 to turbine section 403 or exhaust nozzle 405 where it is mixed with primary exhaust airflow 404 and secondary exhaust airflow 407.

Passive tertiary airflow 409 may be used as part of an infrared (IR) suppression system to cool the exhaust airflow exiting nozzle section 405 instead of active cooling from a blower or other source in the accessor gearbox 406. Because the external airflow 409 in duct 411 does not pass through the engine 400, it has a much lower temperature than the engine exhaust airflow 404. The blower bypass air 409 can be mixed with the engine exhaust 404 to reduce the overall temperature of the air leaving exhaust nozzle 405.

This type of passive IR suppression may impact engine performance due to the extra cooling airflow being introduced into the exhaust airflow 404. The added tertiary airflow 409 creates a backpressure in nozzle section 405, which reduces the primary airflow 404 and thereby reduces the power available from engine 400.

FIG. 4B depicts aircraft engine 400 without the passive, external cooling, which may be achieved by closing door 410 or venting the blower exhaust 409 overboard before turbine section 403 or exhaust nozzle 405. By pausing the tertiary airflow 409, which is normally used for cooling and IR suppression, the backpressure on engine 400 is reduced in turbine section 403 and exhaust nozzle 405. Lowering the backpressure increases the maximum available engine power.

Similar to the improvements noted in FIG. 3B, the increased power available in the configuration shown in FIG. 4B may be useful in certain phases of flight, such as during takeoff/landing or critical mission segments when flight safety has a higher priority than IR suppression. Stopping the tertiary airflow into the exhaust airflow 409 may occur manually and/or automatically.

For example, door 410 may be controlled by an actuator 411. A pilot may be able to manually open and close door 410 using a flight control input 413 or switch on an instrument panel. When selected off manually, the cooling airflow may be blocked until manually selected on again by the pilot or may remain in an off condition for a predetermined interval, such as for one minute. Alternatively, in another embodiment, a flight control computer 414 may open and close door 410 to redirect the cooling airflow under certain aircraft conditions. For example, when the flight control computer 414 recognizes a takeoff configuration, it may turn off the cooling airflow to maximize engine power. The flight control computer 414 may then return cooling airflow to the exhaust airflow after a specified period of time or after flight conditions change, such as, for example, when the landing gear is retracted, when the aircraft is more than a specified height above ground, or when the rotor system and/or engines move between a vertical and horizontal position in a tiltrotor aircraft.

FIG. 5 is a cross-section view of an exhaust area 500 of an engine showing three different airflow streams exiting the engine according to an example embodiment. The primary exhaust airflow 502 comprises hot gas from the engine and exits turbine section 501 through a tailpipe section 503. A secondary exhaust airflow 504 comprises engine bay ejected flow that passes along the outside of the engine and within an engine shroud 505. The secondary exhaust airflow 504 may originate, for example, from vents in an engine bay, from a low-pressure compressor section, from a bypass duct, or the like. The secondary exhaust airflow 504 joins with the primary exhaust airflow 502 in exhaust nozzle area 506. The engine bay ejector flow 504 is roughly parallel to the primary exhaust airflow 502. Since engine bay ejector flow 504 and primary exhaust airflow 502 are parallel with minimal disruption between the layers, there is little mixing and, therefore, engine bay ejector flow 504 has minimal cooling effect on the exhaust gas temperature.

Exhaust area 500 uses a tertiary airflow 507 to swirl relatively cool air into the exhaust. The tertiary airflow 507 originates from one or more sources external to the engine itself, such as the oil cooler blower, an EPS blower, and/or external air vents or doors. Tertiary airflow 507 is introduced at approximately 90 degrees relative to the primary exhaust airflow 502 in a mixing duct 508. By entering the exhaust area 500 off-axis, the tertiary airflow 507 is forced to swirl and mix with primary exhaust airflow 502 and engine bay ejector flow 504 thereby creating a mixed exhaust airflow having a lower net temperature. The resulting lowered temperature will be dependent on the mass flow and temperature of the tertiary airflow 507. It will be understood that in other embodiments, the tertiary airflow 507 may be introduced at angles other than 90 degrees relative to the primary exhaust airflow 502, such as 45-135 degrees off-axis to the primary exhaust airflow 502 to induce a swirling effect in mixing duct 508.

FIG. 6 is a cross-section view 600 of exhaust area 500 (FIG. 5). Primary exhaust airflow 502 exits through a tailpipe section 503. Secondary exhaust airflow 504 joins with primary exhaust airflow 502 in exhaust nozzle area 506. The primary exhaust airflow 502 and secondary exhaust airflow 504 are then mixed with a swirling tertiary airflow 507, introduced at approximately 90 degrees relative to the primary exhaust airflow 502 by a mixing duct 508. The tertiary airflow 507 may come from any source, such as an oil cooler blower, an EPS blower or other auxiliary blower, and/or external air vents or doors. In one embodiment, air 601 from an accessory gearbox blower or external vent is introduced into the mixing duct 508 via duct 602 at approximately 90 degrees to the primary exhaust airflow 502 and secondary exhaust airflow 504. Additionally, or alternatively, air 603 from another accessory gearbox blower or external vent is introduced into the mixing duct 508 via duct 604 at approximately 90 degrees to the primary exhaust airflow 502 and secondary exhaust airflow 504. Because the tertiary airflow 507, such as blower or external air 601 or 603, is introduced off-axis into exhaust airflows 502 and 504, a turbulent mixing of the airflows occurs, which has the effect of lowering the overall temperature exhaust gas mixture. This turbulent mixing also creates backpressure in exhaust area 500, which reduces primary exhaust airflow 502 and thereby reduces power available from the engine.

Embodiments Disclosed Herein

In addition to controlling the flow of tertiary air using blower 310 (FIG. 3A) or vent door 410 (FIG. 4A), one or more doors 605 in mixing duct 508 may be used to control the induction of air from ducts 602 and 604 into the exhaust airflow. Vent doors 605 may be controlled manually or by a flight control computer based upon current aircraft flight status and/or environmental conditions. Vent doors 605 may be guide vanes that can rotate between open and closed positions. Alternatively, vent doors 605 may be sliding doors that move laterally between open and closed positions.

FIG. 7 depicts a flowchart of a process for managing airflow to an engine according to one embodiment. The process may be executed by a flight control computer having a processor and a memory storing computer-executable instructions, for example. The computer-executable instructions cause the processor to perform the steps illustrated in FIG. 7 when executed by the processor. In step 701, the flight control computer identifies a current aircraft flight condition based upon aircraft operating parameters. The aircraft operating parameters may include, for example, a landing gear position, a weight on wheel sensor output, a throttle position, an airspeed, an altitude, an acceleration force, or the like. Additionally, the aircraft operating parameters may comprise engine and accessory gearbox operating conditions, temperatures, pressures, and the like. The aircraft operating parameters may further include environmental conditions, such as air temperature, air pressure, and the like. The current aircraft flight condition may include, for example, a takeoff configuration, a landing configuration, or a mission-specific configuration.

In step 702, if the current aircraft flight condition requires maximum engine power, then the flight control computer stops a flow of cooling air from mixing with primary exhaust airflow of an engine. For example, the aircraft flight condition may indicate a takeoff configuration that requires maximum engine power for safety. The flight control computer may close an access vent that is configured to provide external airflow to a mixing section of the engine. Alternatively, in another embodiment, the flight control computer may stop a blower that is configured to provide accessory airflow to the mixing section of the engine.

In step 703, the flight control computer monitors a temperature of one or more engine accessory components. In step 704, the flight control computer restarts a blower when the accessory component temperature rises above a threshold level. Alternatively, the flight control computer may restart the blower when a rate of change of the temperature is above a threshold level.

In other embodiments, the flight control computer may restart the flow of cooling air after a preset duration or when the current flight condition of the aircraft has changed. For example, if the aircraft has been in a takeoff configuration for longer than one minute, or if the aircraft is no longer in a takeoff configuration (e.g., landing gear retracted, throttles less than maximum), then the flight control computer may restart the flow of cooling air.

FIG. 8 depicts a flowchart of a process for managing engine airflow for an aircraft requiring maximum available power according to an example embodiment. In step 801, a flight control computer (FCC) identifies a flight condition that requires maximum available power for an aircraft. For example, the FCC may determine that the aircraft is in a takeoff configuration and environmental conditions include a high temperature and/or a high altitude. Under these flight conditions, the FCC turns off exhaust cooling airflow in step 802. The exhaust cooling airflow may be, for example, a tertiary engine airflow that is controlled by a fan or a vent. In other situations, a pilot or aircraft operator may manually select a maximum power available mode in step 803. For example, a pilot may identify certain mission phases or anticipated flight conditions that require maximum power available for safety. When the pilot selects maximum power available mode in step 803, the FCC turns off exhaust cooling airflow in step 802.

The aircraft then continues to operate in the maximum power available mode in step 804. Operations in step 804 may continue for some period of time. Eventually, one or more conditions will cause the exhaust cooling airflow is turned on again. Certain aircraft systems may identify an overheating component in step 805. Alternatively, a pilot or operator may select a reduced infrared signature mode for the aircraft in step 806. In other embodiments, the FCC may determine in step 807 that current aircraft flight conditions no longer require maximum available power. In response to one or more of the conditions in steps 805-807, the exhaust cooling airflow is turned on in step 808. In other embodiments, the exhaust cooling airflow may be turned on in step 808 after a preset interval so that the exhaust cooling airflow is never turned off for more than a certain duration.

Embodiments of the present disclosure are not limited to any particular setting or application, and embodiments can be used with a rotor system in any setting or application such as with other aircraft, vehicles, or equipment. It will be understood that tiltrotor aircraft 101 is used merely for illustration purposes and that any aircraft, including fixed wing, rotorcraft, commercial, military, or civilian aircraft may use an engine-exhaust suppressor system as disclosed herein.

In an example embodiment, a system for managing airflow in an engine exhaust comprises a turbine section of an engine configured to create a primary exhaust airflow during operation, an exhaust section coupled to the turbine section and configured to pass the primary exhaust airflow, a mixing section in the exhaust section, the mixing section configured to receive additional airflow from an engine accessory component and to mix the accessory component airflow with the primary exhaust airflow, and a blower configured to selectively provide the accessory component airflow to the mixing section. The accessory component may be selected from a centrifugal blower, an oil cooler blower, and an EPS. The engine may be configured to move between a horizontal position and a vertical position during operation, and the blower may be further configured to selectively provide the accessory component airflow based upon engine position.

The system for managing airflow in an engine exhaust may further comprise a flight control computer configured to turn the blower off when maximum engine power is required. The flight control computer may be configured to identify when maximum engine power is required based upon one or more of aircraft configuration, aircraft flight status, and environmental conditions. The flight control computer may be configured to turn the blower on if accessory cooling is needed without regard to maximum engine power requirements.

In another example embodiment, a system for managing airflow in an engine exhaust comprises a turbine section of an engine configured to create a primary exhaust airflow during operation, an exhaust section coupled to the turbine section and configured to pass the primary exhaust airflow, a mixing section in the exhaust section, the mixing section configured to receive additional airflow from an external vent system and to mix the external vent system airflow with the primary exhaust airflow, and an external access configured to selectively provide the external vent system airflow to the mixing section. The external access may comprise an actuator-driven door coupled to ducting that leads to the mixing section. The engine may be configured to move between a horizontal position and a vertical position during operation, and the external access may be configured to selectively provide the additional airflow based upon engine position.

The system for managing airflow in an engine exhaust may further comprise a flight control computer configured to close the external access when maximum engine power is required. The flight control computer may be configured to identify when maximum engine power is required based upon one or more of aircraft configuration, aircraft flight status, and environmental conditions. The flight control computer may be configured to open the external access if accessory cooling is needed without regard to maximum engine power requirements.

In a further example embodiment, a flight control computer comprises a processor, a memory having stored thereon computer-executable instructions that, when executed by the processor, cause the processor to perform a method for managing airflow to an engine, the processor operating to identify a current aircraft flight condition based upon aircraft operating parameters, and, if the current aircraft flight condition requires maximum engine power, then stopping a flow of cooling air from mixing with primary exhaust airflow of an engine. The current aircraft flight condition may be a takeoff configuration of the aircraft. The computer-executable instructions may further cause the processor to close an access vent that is configured to provide external airflow to a mixing section of the engine. The computer-executable instructions may further cause the processor to stop a blower that is configured to provide accessory airflow to a mixing section of the engine. The computer-executable instructions may further cause the processor to monitor a temperature of one or more engine accessory components and to restart the blower when the temperature rises above a threshold level. The computer-executable instructions may further cause the processor to monitor a temperature of one or more engine accessory components and to restart the blower when a rate of change of the temperature is above a threshold level. The computer-executable instructions may further cause the processor to restart the flow of cooling air after a preset duration. The computer-executable instructions may further cause the processor to restart the flow of cooling air after the current aircraft flight condition has changed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for managing airflow in an engine exhaust, comprising:
   a turbine section of an engine configured to create a primary exhaust airflow during operation;
   an exhaust section coupled to the turbine section and configured to pass the primary exhaust airflow;
   a mixing section in the exhaust section, the mixing section configured to receive airflow from an external source and to mix the external airflow with the primary exhaust airflow;
   a door configured to selectively provide the external airflow to the mixing section; and
   a flight control computer configured to selectively open the door in response to determining accessory cooling is needed without regard to maximum engine power requirements and configured to selectively close the door in response to determining maximum engine power is required.

2. The system of claim 1, wherein the flight control computer is configured to determine the maximum engine power is required based upon one or more of aircraft configuration, aircraft flight status, and environmental conditions.

3. The system of claim 1, wherein the external source is an external vent or duct.

4. The system of claim 1, wherein the engine is configured to move between a horizontal position and a vertical position during operation, and wherein the door is further configured to selectively provide the external airflow based upon engine position.

5. A system for managing airflow in an engine exhaust, comprising:
   a turbine section of an engine configured to create a primary exhaust airflow during operation;
   an exhaust section coupled to the turbine section and configured to pass the primary exhaust airflow;
   a mixing section in the exhaust section, the mixing section configured to receive an external vent system airflow from an external vent system and to mix the external vent system airflow with the primary exhaust airflow;
   an external access configured to selectively provide the external vent system airflow to the mixing section; and
   a flight control computer configured to open the external access if accessory cooling is needed without regard to maximum engine power requirements.

6. The system of claim 5, further comprising:
   the flight control computer configured to close the external access when maximum engine power is required.

7. The system of claim 6, wherein the flight control computer is configured to identify when maximum engine power is required based upon one or more of aircraft configuration, aircraft flight status, and environmental conditions.

8. The system of claim 5, wherein the external access comprises an actuator-driven door coupled to ducting that leads to the mixing section.

9. The system of claim 5, wherein the engine is configured to move between a horizontal position and a vertical position during operation, and wherein the external access is further configured to selectively provide the external vent system airflow based upon engine position.

* * * * *